United States Patent
Kobayashi et al.

(10) Patent No.: US 7,279,069 B2
(45) Date of Patent: Oct. 9, 2007

(54) ADHESIVE CURING METHOD, CURING APPARATUS, AND OPTICAL DISC LAMINATION APPARATUS USING THE CURING APPARATUS

(75) Inventors: Hideo Kobayashi, Tokyo (JP); Shinichi Shinohara, Tokyo (JP); Hironobu Nishimura, Tokyo (JP)

(73) Assignee: Origin Electric Company Limited, Tokyo (JP)

( * ) Notice: Subject to any disclaimer, the term of this patent is extended or adjusted under 35 U.S.C. 154(b) by 305 days.

(21) Appl. No.: 10/217,150

(22) Filed: Aug. 12, 2002

(65) Prior Publication Data

US 2004/0011457 A1 Jan. 22, 2004

(30) Foreign Application Priority Data

Jul. 18, 2002 (JP) .............................. 2002-209897

(51) Int. Cl.
*B32B 37/00* (2006.01)
*B29C 35/02* (2006.01)

(52) U.S. Cl. .............................. 156/380.9; 156/275.5; 156/379.6; 156/379.8

(58) Field of Classification Search ............ 156/272.2, 156/275.5, 275.7, 379.6, 379.8, 379.9, 380.9; 250/504 R See application file for complete search history.

(56) References Cited

U.S. PATENT DOCUMENTS

| | | | | |
|---|---|---|---|---|
| 4,010,374 A | * | 3/1977 | Ramler | 250/492.1 |
| 5,779,855 A | * | 7/1998 | Amo et al. | 156/379.6 |
| 5,968,305 A | * | 10/1999 | Maenza | 156/272.8 |
| 6,561,640 B1 | * | 5/2003 | Young | 347/102 |
| 6,613,170 B1 | | 9/2003 | Ohno et al. | |
| 7,001,474 B2 | * | 2/2006 | Katayama et al. | 156/74 |
| 2002/0192569 A1 | * | 12/2002 | Ulland et al. | 430/5 |
| 2003/0131941 A1 | * | 7/2003 | Baggett et al. | 156/380.9 |
| 2004/0134603 A1 | | 7/2004 | Kobayashi et al. | |

FOREIGN PATENT DOCUMENTS

| | | | |
|---|---|---|---|
| GB | 2362207 A | * | 11/2001 |
| JP | 05-129662 | | 5/1993 |

(Continued)

OTHER PUBLICATIONS

Abstract for JP 09116297.*

(Continued)

*Primary Examiner*—Jeff H. Aftergut
*Assistant Examiner*—John L. Goff
(74) *Attorney, Agent, or Firm*—Hoffmann & Baron, LLP

(57) ABSTRACT

The object of the present invention is to considerably reduce the amount of heat generated in comparison with a conventional lamp to decrease the thermal effects on an optical disc in an adhesive curing method suitable for curing adhesive supplied between the substrates of a DVD or other optical disc in particular. In the adhesive curing method as claimed in the present invention, an adhesive is cured by irradiating with ultraviolet rays using semiconductor elements that emit ultraviolet rays instead of a lamp. In this case, light-emitting semiconductor elements are used that emit ultraviolet rays having a wavelength within a range in which the transmittance relative to the adhesive before curing is lower than the transmittance relative to the adhesive after curing.

4 Claims, 6 Drawing Sheets

FOREIGN PATENT DOCUMENTS

| | | |
|---|---|---|
| JP | 06-085330 | 3/1994 |
| JP | 09116297 A * | 5/1997 |
| JP | 09-161333 | 6/1997 |
| JP | 2000-123427 | 4/2000 |
| JP | 2000-268416 | 9/2000 |
| JP | 2001-209980 | 8/2001 |

OTHER PUBLICATIONS

Handheld Cordless Photopolymerization Tool for Dental Use, 3M Health Care Website (Oct. 18, 2002).

* cited by examiner

ADHESIVE CURING METHOD, CURING APPARATUS, AND OPTICAL DISC LAMINATION APPARATUS USING THE CURING APPARATUS

This application claims priority to Japanese Patent Application No. 2002-209897 filed on Jul. 18, 2002.

BACKGROUND OF THE INVENTION

1. Field of the Invention

The present invention relates to an adhesive curing method, and more particularly, to an adhesive curing method suitable for curing an adhesive supplied between substrates of DVDs and other optical discs, and a curing apparatus.

2. Description of the Related Art

In general, DVDs and other optical discs employ a basic structure in which two transparent substrates are laminated with an adhesive. These substrates consist of those in which a recording layer that contains a reflective layer or semi-reflective layer is formed on one substrate only, or those in which a recording layer is formed on both substrates. In the case of those in which a recording layer is formed on one substrate only, there are those in which the thicknesses of both substrates are equal, and those in which the substrate on which the recording layer is not formed is in the form of a thin, transparent sheet. Moreover, there are also those that employ a structure in which four substrates are laminated by laminating two of the above laminated structures by means of an adhesive. In addition, examples of other structures include those in which a plurality of sheets transparent glass or lenses are laminated by means of an adhesive.

In such cases, in DVDs and other optical discs, after laminating two substrates by means of adhesive, the substrates are rotated at high speed to uniformly spread the adhesive between the substrates while also shaking off excess adhesive. Moreover, adhesive is typically cured in a short period of time by irradiating either one or both of the substrates with ultraviolet rays. Irradiation with ultraviolet rays is carried out by continuously irradiating with ultraviolet rays for a prescribed amount of time using a UV lamp, or irradiating with ultraviolet rays in pulses using a xenon lamp.

However, curing methods that use these lamps have the problems described below in all cases.

(1) In the case of using a UV lamp, since the emission efficiency is low and heat generation is extremely high, the substrates may be warped by the heat, or because an adequate heat dissipation mechanism is required, the apparatus becomes large and costs become high.

(2) Since UV lamps are expensive and have a short service life, in addition to resulting in high running costs, since they must be replaced every several tens of hours in the case of those having a particularly short service life, they also have a detrimental effect on productivity.

(3) In the case of irradiating with pulsed ultraviolet rays, although they are considerably advantageous in comparison with continuous irradiation in terms of heat, the impact during irradiation is large and due to vibrations at that time, glass or other adhered objects may be damaged or they may have a detrimental effect on the adhesion of the adhered object. In addition, there is also the possibility of the impact sound at that time resulting in noise that has a detrimental effect on the environment. Moreover, damping mechanisms and noise prevention mechanisms provided to solve these problems result in increased size of the apparatus and higher costs.

(4) In the case of using a xenon lamp, since the electrical power loss is extremely large, this is unsuitable both in terms of effects on the environment and costs.

In order to solve the above shortcomings of the prior art, the present invention is characterized by curing adhesive by irradiating with ultraviolet rays using a semiconductor element that emits ultraviolet rays, and more particularly, by using a light-emitting semiconductor element having a wavelength range in which the transmittance relative to the adhesive prior to curing is lower than the transmittance relative to the adhesive after curing.

SUMMARY OF THE INVENTION

In order to solve this problem, a first invention of the present invention is a method for curing at least portion of an adhesive by irradiating with light; wherein, adhesive is cured by ultraviolet rays having a wavelength for which the peak emission intensity is within the range of 280-450 nm.

In addition, a second invention of the present invention is according to the above first invention, and is characterized in that the wavelength of the ultraviolet rays is within a range in which the transmittance relative to the adhesive before curing is lower than the transmittance relative to the adhesive after curing.

According to this invention, since transmittance of the ultraviolet rays improves accompanying curing of the adhesive, the adhesive can be cured more effectively.

A third invention of the present invention is according to either the above first or second invention, and is characterized in that ultraviolet rays are emitted by a light-emitting semiconductor element, and do not substantially contain light of a wavelength outside the range of 280-450 nm.

According to this invention, since the generation of heat is much less than a conventional lamp, the thermal effects of the ultraviolet rays on the optical disc serving as the irradiated object can be reduced. In addition, since the light-emitting semiconductor element has a considerably longer service life than a lamp, running costs are reduced. In addition, since the amount of electrical power used for emitting light is extremely low, effects on the environment can be reduced. Moreover, since the transmittance of the ultraviolet rays improves accompanying curing of the adhesive, the adhesive can be cured more effectively.

A fourth invention of the present invention is according to any of the above first through third inventions, and is characterized in that a polymerization initiator is added to the adhesive that initiates photopolymerization by irradiating with ultraviolet rays having a wavelength in the range of 280-450 nm.

According to this invention, the adhesive can be cured extremely efficiently by using a light-emitting diode that emits light of a narrow wavelength range.

A fifth invention of the present invention is according to any of the above first through fourth inventions, and is characterized in that in the step during and/or prior to curing of the adhesive, light from a light-emitting diode that emits light having a wavelength that substantially does not contain a wavelength of 280-450 nm is used as the emitting light.

According to this invention, since the adhesive is not cured even in the case of increasing the amount of photo-polymerization initiator added, which initiates photopolymerization by irradiation with ultraviolet rays having a wavelength in the range of 280-450 nm, without requiring special handling, it can be handled normally.

A sixth invention of the present invention is according to any of the above first through fifth inventions, and is characterized in that the distance between the emitting surface of the ultraviolet rays and the irradiated surface of the optical disc substrate serving as the irradiated object is 10 mm or less, and preferably 7 mm or less.

According to this invention, together with decreasing the thermal effects on the optical disc, the adhesive can be cured more efficiently.

A seventh invention of the present invention is according to any of the first through sixth inventions, and is characterized in that the ultraviolet rays and adhesive are moved relative to each other.

According to this invention, the adhesive can be cured more uniformly.

An eighth invention of the present invention is a curing method for curing an adhesive that is provided between a first substrate and a second substrate in which a recording layer is formed on at least one substrate; wherein, the adhesive is cured by irradiating with ultraviolet rays emitted by a light-emitting semiconductor element through one or both of the first and second substrates, and/or from the outside of those substrates.

According to this invention, the adhesive can be cured more efficiently and uniformly.

A ninth invention of the present invention is according to the above eighth invention, and is characterized in that the adhesive is cured by irradiating with ultraviolet rays having a wavelength within a range in which the transmittance relative to the adhesive before curing is lower than the transmittance relative to the adhesive after curing in a low-speed rotating state or stopped state following completion of high-speed rotation for spreading the adhesive provided between the first and second substrates.

According to this invention, together with the adhesive being able to be cured more efficiently and uniformly, quality can also be improved.

A tenth invention of the present invention is according to the above eighth invention, and is characterized in that the adhesive is cured or semi-cured by sequentially irradiating with ultraviolet rays from the inside to the outside of the first and second substrates in a low-speed rotating state or stopped state following completion of high-speed rotation for spreading the adhesive provided between the first and second substrates.

According to this invention, together with the adhesive being able to be cured more efficiently, quality can be improved.

An eleventh invention of the present invention is according to any of the above eighth through tenth inventions, and is characterized in that in the case one or both of either the first substrate or second substrate is composed of a polycarbonate material, ultraviolet rays having a wavelength of a specific range that is longer than the wavelength in the vicinity where the optical transmittance relative to this polycarbonate material becomes saturated are irradiated.

According to this invention, together with the adhesive being able to be cured more efficiently, the thermal effects on the substrates can be reduced.

A twelfth invention of the present invention is according to the above eleventh invention, and is characterized in that the specific wavelength is mainly within the range of 280-450 nm.

A thirteenth invention of the present invention is according to any of the above eighth to twelfth inventions, and is characterized in that irradiation of ultraviolet rays onto adhesive that has protruded from between the first substrate and second substrate is carried out in an atmosphere having an oxygen concentration lower than air.

According to this invention, adhesive that has protruded from between the substrates can be cured more efficiently and effectively.

A fourteenth invention of the present invention is according to any of the above ninth to thirteenth inventions, and is characterized in that the film thickness of the adhesive layer between the first and second substrates is detected, and ultraviolet rays are irradiated when the film thickness has decreased to a set thickness accompanying high-speed rotation.

According to this invention, together with the adhesive being able to be cured more efficiently, quality can be improved.

A fifteenth invention of the present invention is according to the above thirteenth invention, and is characterized in that the film thickness of the adhesive layer between the first and second substrates is detected, and ultraviolet rays are sequentially irradiated over a specific range along the circumferential direction of the substrates, including a location where the film thickness has decreased to a set thickness accompanying high-speed rotation.

A sixteenth invention of the present invention is an apparatus for curing a resin spread between a transparent first substrate and second substrate by irradiating with ultraviolet rays through the substrates; wherein, a semiconductor light-emitting apparatus, comprised of arranging a plurality of light-emitting semiconductor elements at nearly constant intervals or in close mutual proximity over nearly the same surface area as the cured surface area of the adhesive, is arranged at a prescribed distance from the adhesive, and the adhesive is cured by ultraviolet rays emitted by the plurality of light-emitting semiconductor elements.

According to this invention, the generation of heat can be reduced considerably in comparison with a conventional lamp, and thermal effects on optical discs can be decreased. In addition, since the light-emitting semiconductor elements have a longer service life than that of a lamp, running costs are reduced. Moreover, since the amount of electrical power used for emitting light is extremely low, effects on the environment can be reduced.

A seventeenth invention of the present invention is according to the above sixteenth invention, and is characterized in that the plurality of light-emitting semiconductor elements are arranged in the shape of a spiral, concentric circles or polygon, or are arranged randomly.

An eighteenth invention of the present invention is according to either the above sixteenth or seventeenth invention, and is characterized in that the plurality of light-emitting semiconductor elements are arranged in the shape of a spiral, and the adhesive is irradiated by sequentially emitting ultraviolet rays on a time delay from the inside to the outside for each adjacent light-emitting semiconductor element or for each plurality of light-emitting semiconductor elements.

According to this invention, together with the adhesive being able to be cured more effectively, quality can be improved.

A nineteenth invention of the present invention is according to either the above sixteenth or seventeenth invention, and is characterized in that the plurality of light-emitting semiconductor elements are arranged in the shape of concentric circles, and the adhesive is sequentially irradiated with ultraviolet rays at a delay from the inside to the outside by adjacent light-emitting semiconductor elements that form the concentric circles along the radial direction.

A twentieth invention of the present invention is according to either the above eighteenth invention or nineteenth invention, and is characterized in that the light-emitting semiconductor elements are either mutually connected in parallel or a prescribed number are connected in series, and those that are connected in series are connected in parallel.

According to this invention, a curing apparatus can be provided that is able to use a lower voltage power supply and has higher reliability.

A twenty-first invention of the present invention is according to any of the above eighteenth to twentieth inventions, and is characterized in that the overall length of the delay time of ultraviolet rays sequentially emitted on a time delay is nearly equal to or longer than the prescribed curing time of the adhesive.

A twenty-second invention of the present invention is according to any of the above sixteenth to twenty-first inventions, and is characterized in that the semiconductor light-emitting apparatus is arranged at a location within 10 mm, and preferably within 7 mm, from the adhesive.

A twenty-third invention of the present invention is according to any of the above sixteenth to twenty-second inventions, and is characterized in that adhesive is spread between a first substrate and second substrate on which a recording layer is formed on at least one substrate, and ultraviolet rays are irradiated through one or both of the first and second substrates.

A twenty-fourth invention of the present invention is an apparatus for curing an adhesive spread between a first substrate and second substrate on which a recording layer is formed on at least one substrate by irradiating with ultraviolet rays; wherein, a semiconductor light-emitting apparatus, comprised of light-emitting semiconductor elements arranged in a single row or a plurality of rows so as to extend from the inside to the outside of the recording layer, is arranged at a prescribed distance from the adhesive, the semiconductor light-emitting apparatus is rotated by at least one revolution relative to the first and second substrates, and the adhesive is cured by irradiating with ultraviolet rays emitted by the light-emitting semiconductor elements through one or both of the first and second substrates.

According to this invention, the generation of heat can be reduced considerably in comparison with a conventional lamp, and thermal effects on optical discs can be decreased. In addition, since the light-emitting semiconductor elements have a longer service life than that of a lamp, running costs are reduced. Moreover, since the amount of electrical power used for emitting light is extremely low, effects on the environment can be reduced.

A twenty-fifth invention of the present invention is an apparatus for curing an adhesive spread between a first substrate and a second substrate on which a recording layer is formed on at least one substrate by irradiating with ultraviolet rays; wherein, a semiconductor light-emitting apparatus comprised of one or more light-emitting semiconductor elements is arranged at a location away from the outer peripheral surfaces of the first and second substrates, the semiconductor light-emitting apparatus and first and second substrates are rotated relative to each other, and adhesive that has escaped from between the first and second substrates is cured by irradiating the outer peripheral surfaces of the first and second substrates with ultraviolet rays emitted from the light-emitting semiconductor elements.

A twenty-sixth invention of the present invention is according to any of the above sixteenth to twenty-fifth inventions, and is characterized in that a gas spraying means is provided that sprays an inert gas such as nitrogen gas onto the surface of the adhesive irradiated with ultraviolet rays.

A twenty-seventh invention of the present invention is according to any of the above sixteenth to twenty-sixth inventions, and is characterized in that the ultraviolet rays emitted by light-emitting semiconductor elements of the semiconductor light-emitting apparatus have a wavelength of a range in which optical transmittance relative to the adhesive before curing is lower than transmittance relative to the adhesive after curing.

A twenty-eighth invention of the present invention is according to any of the above sixteenth to twenty-seventh inventions, and is characterized in that a light-emitting diode primarily emitting light having a wavelength within the range of 280-450 nm is used for the light-emitting semiconductor elements of the semiconductor light-emitting apparatus.

A twenty-ninth invention of the present invention is according to any of the above sixteenth to twenty-eighth inventions, and is characterized in that the light-emitting semiconductor elements are fixed on a printed wiring board, and connected to an electrically conductive pattern formed on the printed wiring board.

A thirtieth invention of the present invention is an optical disc lamination apparatus provided with: a spinner apparatus for spreading an adhesive between a first substrate and a second substrate on which a recording layer is formed on at least one substrate, and a curing apparatus that cures an adhesive by irradiating the adhesive with ultraviolet rays through the substrates; wherein, the curing apparatus is composed by arranging a semiconductor light-emitting apparatus, comprised of arranging a plurality of light-emitting semiconductor elements at nearly constant intervals or in close mutual proximity over nearly the same surface area as the cured surface area of the adhesive, at a prescribed distance from the substrates, the adhesive spread by the spinner apparatus is cured by irradiating with ultraviolet rays emitted by the plurality of light-emitting semiconductor elements through the substrates, and the first and second substrates are laminated.

A thirty-first invention of the present invention is an optical disc lamination apparatus provided with: a spinner apparatus for spreading an adhesive between a first substrate and a second substrate on which a recording layer is formed on at least one substrate, and a curing apparatus that cures an adhesive by irradiating the adhesive with ultraviolet rays through the substrates; wherein, the curing apparatus is composed by arranging a semiconductor light-emitting apparatus, comprised of arranging light-emitting semiconductor elements in a single row or a plurality of rows so as to extend from the inside to the outside of the recording layer, at a prescribed distance from the substrates, the semiconductor light-emitting apparatus is rotated by at least one revolution relative to the first and second substrates, the adhesive spread by the spinner apparatus is cured by irradiating with ultraviolet rays emitted by the plurality of light-emitting semiconductor elements through the substrates, and the first and second substrates are laminated.

A thirty-second invention of the present invention is according to either the above thirtieth or thirty-first invention, and is characterized in that after adhesive between the first substrate and second substrate is spread by high-speed rotation of a turntable in a spinner apparatus, the adhesive is cured by irradiating with ultraviolet rays on the turntable.

A thirty-third invention of the present invention is according to the above thirty-second invention, and is characterized in that the turntable is rotated when the adhesive is irradiated with ultraviolet rays.

A thirty-fourth invention of the present invention is according to either the above thirty-second or thirty-third invention, and is characterized in that the turntable is positioned higher than a partition of the spinner apparatus when the adhesive is irradiated with ultraviolet rays.

A thirty-fifth invention of the present invention is according to any of the above thirtieth to thirty-fourth inventions, and is characterized in that the light-emitting semiconductor elements are fixed on a printed wiring board, and connected to a conductive pattern formed on the printed wiring board.

A thirty-sixth invention of the present invention is according to any of the above thirtieth to thirty-fifth inventions, and is characterized in that an adhesive curing apparatus disclosed in any of the above sixteenth to twenty-ninth inventions is provided.

DESCRIPTION OF THE PREFERRED EMBODIMENTS

The present invention is characterized by curing an adhesive layer sandwiched between two substrates comprised of a material like polycarbonate or glass that is easily permeable to light by irradiating with ultraviolet rays from a semiconductor light-emitting apparatus composed by arranging a plurality of light-emitting diodes.

Figure 1:
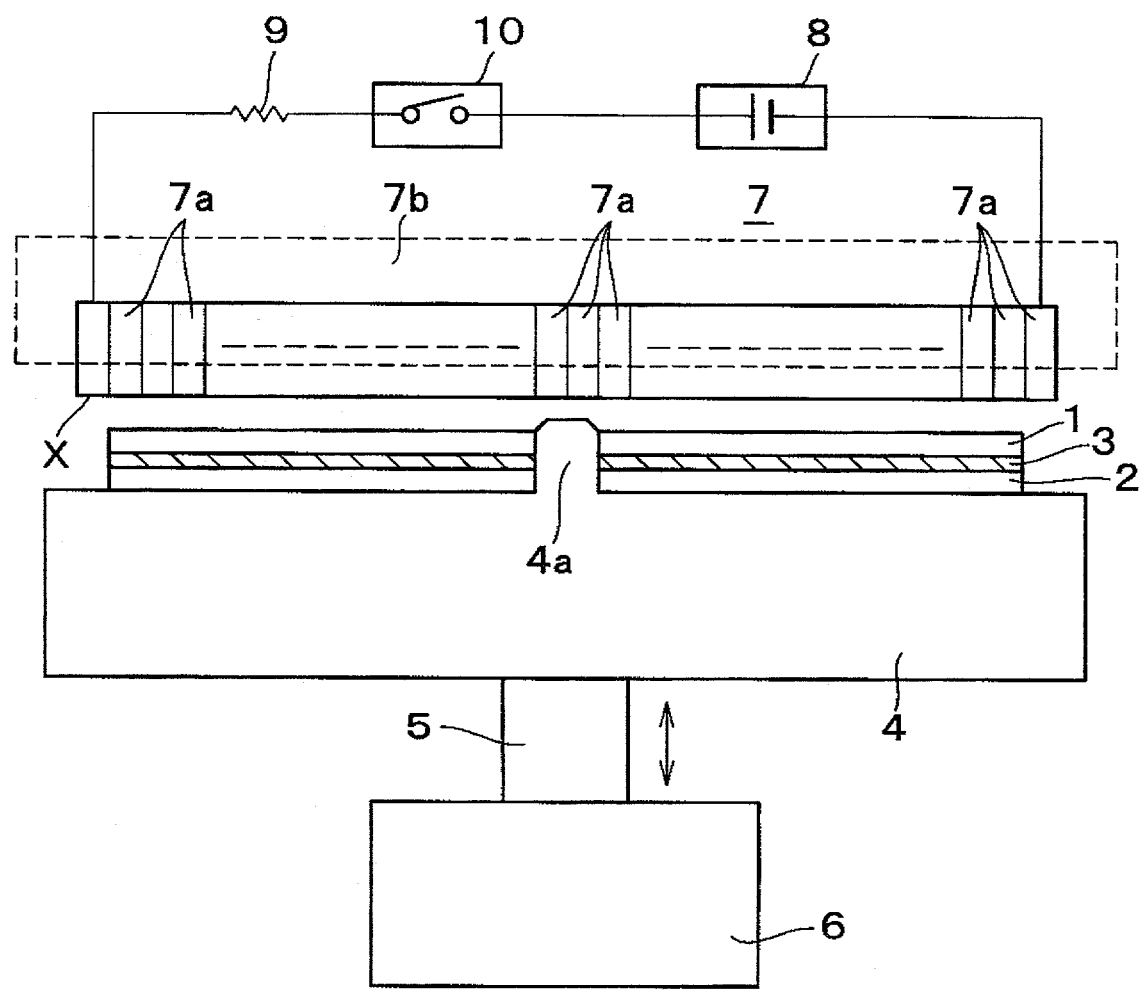
FIG. 1 is a drawing showing an embodiment of an adhesive curing apparatus and an optical disc lamination apparatus in which it is used as claimed in the present invention.
Figure 2:
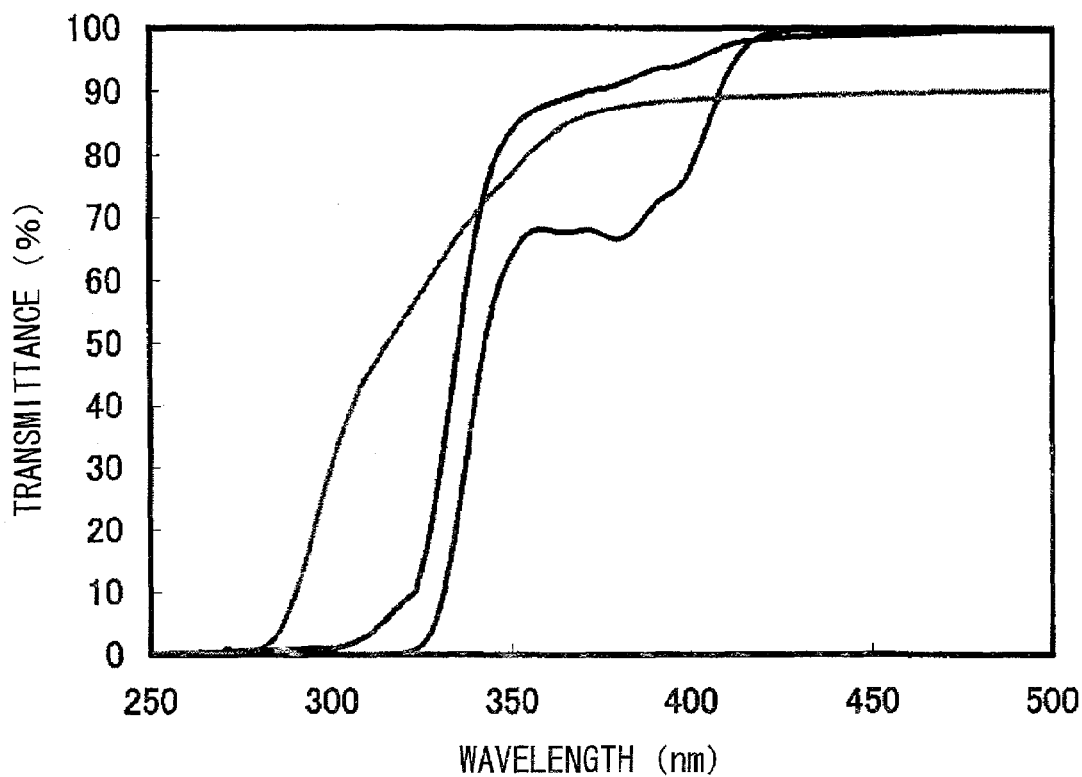
FIG. 2 is a drawing for explaining the present invention that shows an example of the relationship between optical wavelength and substrate transmittance.
Figure 3:
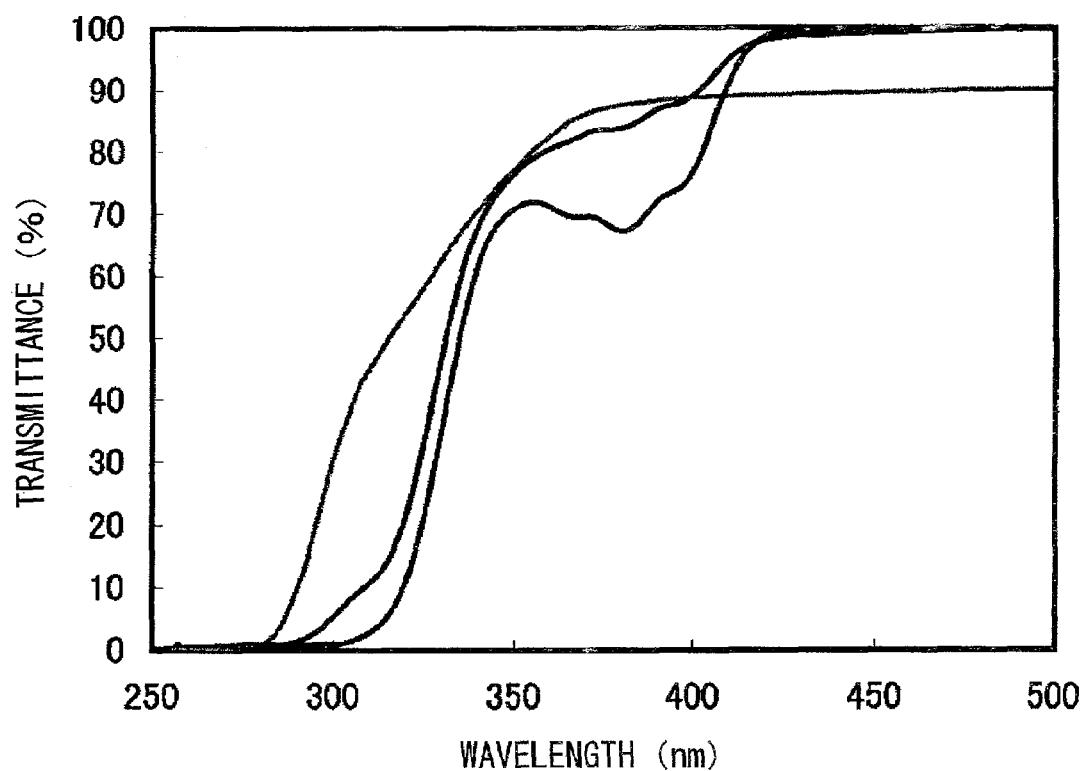
FIG. 3 is a drawing for explaining the present invention that shows another example of the relationship between optical wavelength and substrate transmittance.

The following provides an explanation of an embodiment of the present invention using FIGS. 1 through 3. In FIG. 1, reference symbols 1 and 2 indicate substrates in the manner of disc substrates made of a polycarbonate material, and an adhesive layer 3, which has been spread by high-speed rotation and so forth, is formed between the substrates 1 and 2. The substrates made of polycarbonate constitute the majority of substrates currently in use. In the case a recording layer containing a reflective layer is formed on only one of the substrates 1 and 2, the recording layer is not formed on the substrate 1, but rather the recording layer containing a reflecting layer is formed on the substrate 2. In addition, in the case recording layers are formed on both substrates, a recording layer containing a semi-reflecting layer is formed on the substrate 1, while a recording layer containing a reflecting layer is formed on the substrate 2. Reference symbol 4 indicates a holder for the substrates 1 and 2, and in this embodiment, the holder 4 is coupled to a raising and lowering drive apparatus 6 by a raising and lowering shaft means 5. A positioning means 4a for positioning the substrates 1 and 2 is provided in the center of the holder 4, and when holding the substrates 1 and 2, the positioning means 4a is inserted into center holes of the substrates 1 and 2.

Immediately above the upper substrate 1, a semiconductor light-emitting unit 7 that is composed of a large number of light-emitting semiconductor elements in the form of light-emitting diodes 7a and a support 7b that supports them is arranged. In this embodiment, the large number of light-emitting diodes 7a are arranged in close proximity, and attached to the support 7b so that a light-emitting surfaces X of the large number of light-emitting diodes 7a are all in the same plane. Although the large number of light-emitting diodes 7a may be arranged randomly in close proximity, they are preferably arranged in the shape of concentric circles or a spiral. The manner in which the large number of light-emitting diodes 7a are arranged will be described later in detail. Although not shown in the drawings, together with the large number of light-emitting diodes 7a all being connected in parallel, a protective resistor is connected in series to each light-emitting diode 7a. In the case of actual assembly, since surface-mounted light-emitting diodes and resistors should be surface-mounted to a disc-shaped printed wiring board that serves as the support 7b or a portion thereof, it can be produced easily even if there are, for example, about 350-450 light-emitting diodes and resistors each. Here, one reason for connecting the light-emitting diodes 7a in parallel instead of in series is that, since malfunctions of the light-emitting diodes 7a consist of short-circuits and open circuits, if they are connected in series, light emission by the semiconductor light-emitting unit 7 would be impaired when the malfunction was an open circuit, while another reason is that, since the voltage drop of the light-emitting diodes is several volts per diode, if 350-450 of diodes were connected in series, a high voltage in excess of 1000 V would be required.

The cathode side of each light-emitting diode 7a is connected to the negative electrode of a direct current power supply 8, while the anode side is connected to the positive electrode of the direct current power supply 8 via a protective resistor 9 and switching apparatus 10. Although the switching apparatus 10, in its simplest form, may be that which opens and closes a circuit at a constant period, there are also cases in which a simple sequencer or CPU may be provided in order to sequentially connect and disconnect a certain plurality of light-emitting diodes 7a. Here, the light-emitting surface X of each light-emitting diode 7a does not make contact with the upper surface of the upper substrate 1, and moreover, the narrower the gap between the light-emitting surface X and the upper surface of upper substrate 1, the better the irradiation efficiency. This is because light attenuates in proportion to the square of the distance, and the gap between the light-emitting surface X and the upper surface of upper substrate 1 should be 10 mm or less, and preferably within the range of 1-7 mm.

Figure 4:
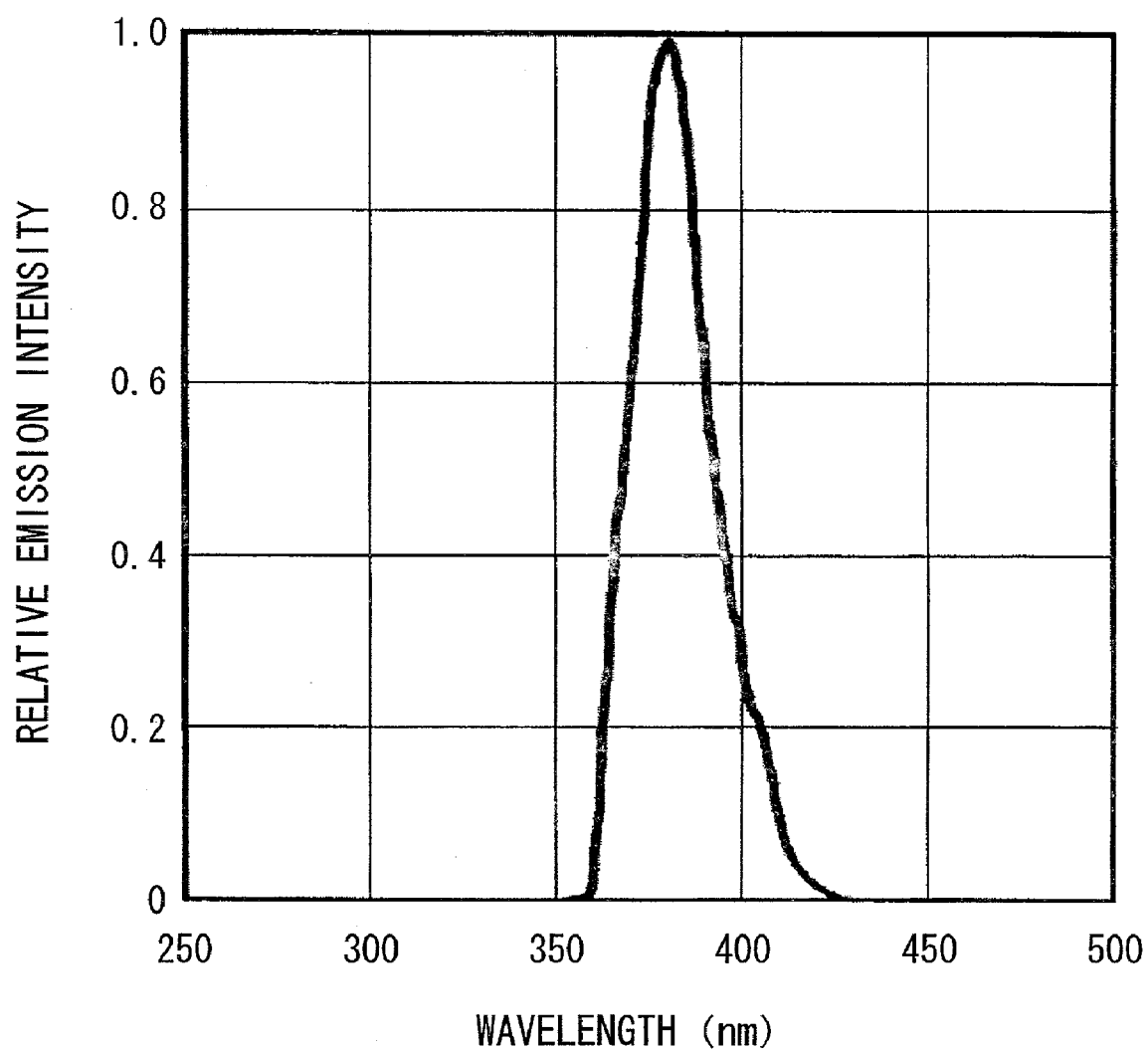
FIG. 4 is a drawing showing the emission characteristics of a light-emitting diode for emission of ultraviolet rays used in the present invention.

Next, an explanation is provided of the preferable characteristics of the light-emitting diodes 7a used in this invention using FIGS. 2 through 4. Optical wavelength is indicated on the horizontal axes of FIGS. 2 and 3, while the transmittance of the wavelength at that time is indicated on the vertical axes. Curve A indicates the transmittance of a polycarbonate substrate, curve B that of an adhesive prior to irradiation with ultraviolet rays, and curve C that of an adhesive following curing by irradiation with ultraviolet rays. It can be determined from these drawings that in the case of a substrate composed of a polycarbonate material, transmittance increases rapidly starting from an optical wavelength of about 280 nm. In this embodiment, since an adhesive is cured by irradiating with ultraviolet rays through the substrate 1 or 2 of an optical disc, ultraviolet rays having a wavelength shorter than 280 nm are difficult to use due to their low transmittance. Thus, ultraviolet rays are used having a wavelength of 280 nm or longer, and preferably 300 nm or longer, due to the high transmittance at these wavelengths.

It can be determined from FIGS. 2 and 3 that the adhesive used in the present invention has a wavelength region in which transmittance before irradiation with ultraviolet rays is lower than that after curing by irradiation with ultraviolet rays. This wavelength region is from about 280 nm to about 450 nm, and in this wavelength region, the transmittance of the adhesive is enhanced accompanying curing of the adhesive by irradiating with light. According to the inventors of the present invention, it was found that, although a higher absorption rate of ultraviolet rays of the adhesive results in greater efficiency in terms of promoting curing, even if the absorption rate of the ultraviolet ray of the adhesive is high, if the ultraviolet ray transmittance of the polycarbonate substrates is too low, the substrates end up deteriorating. In addition, the optical wavelength at this time was less than 280 nm. Moreover, if light having a wavelength longer than 600 nm is irradiated at sufficient intensity and for a sufficient amount of time for curing an adhesive, it was determined that problems occur such as deterioration and damage to the organic pigment film of the optical disc recording layer. Namely, optical wavelengths at which problems occur in the optical disc itself were those that are shorter than 280 nm and longer than 600 nm.

Thus, in this invention, a wavelength region of 280-600 nm was first selected as the optical wavelength emitted by the light-emitting diodes. As a result of irradiating the adhesive with various wavelengths of light in this wavelength region through the polycarbonate substrates, it was able to be confirmed that the adhesive photopolymerization reaction takes place in the case of the wavelength of light emitted by the light-emitting diodes is 280-450 nm, and that the adhesive photopolymerization reaction takes place satisfactorily and there are no detrimental effects on the substrates or recording layer and so forth in the case the wavelength is 300-420 nm in particular. The wavelength region of 280-450 nm is nearly the same as the wavelength region in which the transmittance of ultraviolet rays before curing the adhesive is lower than the transmittance of ultraviolet rays after curing.

FIG. 4 shows the characteristics of a commercially available semiconductor element for emitting ultraviolet rays, and wavelength is plotted on the horizontal axis while relative emission intensity is plotted on the vertical axis. As can be understood from FIG. 4, the wavelength range of light that is emitted by the semiconductor element for emitting ultraviolet rays is narrow at about 360-420 nm, and the peak intensity is at about 380 nm. Since ultraviolet rays at this wavelength of about 380 nm are within the above preferable wavelength region of 300-420 nm, this commercially available semiconductor element for emitting ultraviolet rays can be understood to be extremely preferable as the light source for emission of ultraviolet rays. Thus, in the present invention, a light-emitting diode for irradiating ultraviolet rays that emits ultraviolet rays of a wavelength like that shown in FIG. 4 is used for the light source that emits ultraviolet rays. In the case of using a light-emitting diode for irradiating ultraviolet rays that emits ultraviolet rays of a wavelength like that shown in FIG. 4, nearly all of the emitted light is useful in curing the adhesive layer between the substrates. The light-emitting diodes used in the following description are light-emitting diodes for irradiating ultraviolet rays that emit ultraviolet rays of a wavelength like that shown in FIG. 4, or are light-emitting diodes that emit ultraviolet rays of which nearly all are within the wavelength region of 280-450 nm.

Next, an explanation is provided regarding the operation of this embodiment. The substrates 1 and 2, which are laminated by the adhesive layer 3 in an ordinary spinner apparatus not shown in FIG. 1, are placed on the substrate holder 4 by an ordinary substrate transport means not shown. Nearly simultaneous to this, the raising and lowering drive apparatus 6 begins to operate, the raising and lowering shaft means 5 rises, and then the raising and lowering drive apparatus 6 stops so that the upper surface of the upper substrate 1 is positioned at a location 1-10 mm away, and preferably 1-7 mm away, from the light-emitting surface X of the semiconductor light-emitting unit 7. Simultaneous to this stopping, or at the point the upper surface of the upper substrate 1 has approached a prescribed distance within 10 mm of the light-emitting surface X of the semiconductor light-emitting unit 7, the switching apparatus 10 is activated, current flows to a switching element not shown of the switching apparatus 10, the protective resistor 9 and all light-emitting diodes 7a of the semiconductor light-emitting unit 7 from the direct current power supply 8, and all light-emitting diodes 7a emit ultraviolet rays of a wavelength mainly within the range of 280-450 nm. These ultraviolet rays are irradiated onto the adhesive layer 3 through the upper substrate 1 causing curing of the adhesive layer 3. Subsequently, the raising and lowering drive apparatus 6 operates again to the lower raising and lowering shaft means 5, and the substrates 1 and 2 on the substrate holder 4 are discharged by an ordinary substrate transport means not shown.

Here, although the intensity of the emitted light of light-emitting diodes 7a is weaker in comparison to an ordinary xenon lamp or other lamp that emits ultraviolet rays, the heat generated is incomparably lower. Thus, since thermal effects on the substrate are minimal, the distance between the light-emitting surface X of semiconductor light-emitting unit 7 and substrate 1 as mentioned above can be made much smaller than in the case of a lamp.

In addition, in this embodiment, since the light-emitting diodes 7a are arranged in close proximity, the light from surrounding the adjacent light-emitting diodes 7a mutually overlaps. Thus, even if, for example, one of the adjacent light-emitting diodes 7a is damaged, the effect can be suppressed to a minimum, and there is no occurrence of a substantially detrimental effect on curing of the adhesive.

Moreover, since the light-emitting diodes 7a are arranged in the semiconductor light-emitting unit 7 so that the light-emitting diodes 7a protrude from the outer periphery of the substrates 1 and 2 by about the size of a single light-emitting diode, adhesive that has protruded from between the substrates 1 and 2 can also be cured.

However, in order to efficiently cure adhesive that has protruded from between the substrates 1 and 2 in a short period of time, together with arranging one or a plurality of light-emitting diodes not shown at equal intervals at location 1-10 mm away from the outer periphery of the substrates 1 and 2 so as to effectively irradiate adhesive that has protruded from between the substrates 1 and 2 with light from those light-emitting diodes, the substrates 1 and 2 and the light-emitting diodes are rotated relative to each other. Normally, the substrates 1 and 2 are rotated. In addition, since the curing rate of the adhesive is slowed by the presence of oxygen, a gas spray nozzle that sprays an inexpensive inert gas such as nitrogen gas is provided at the location the adhesive is irradiated by the above light-emitting diodes not shown, and by surrounding the adhesive irradiated with these ultraviolet rays with nitrogen gas, curing of the adhesive can be accelerated resulting in shortened curing time.

In this embodiment, although the distance between the light-emitting surface X of the semiconductor light-emitting unit 7 and substrates 1 and 2 is decreased or increased by the raising or lowering substrate holder 4, by placing the substrates 1 and 2 on a substrate holder on a turntable not shown, and intermittently or continuously rotating the turntable in the horizontal direction as in the prior art, the substrates 1 and 2 can be made to pass below the light-emitting surface X of semiconductor the light-emitting unit 7 at a prescribed distance from the said light-emitting surface X.

Moreover, in a different embodiment, an adhesive is irradiated with ultraviolet rays from a semiconductor light-emitting unit during rotation of a spinner apparatus. Although this embodiment is explained using FIG. 5, before providing an explanation, a brief explanation is provided regarding the production process typically used to produce optical discs. In the production process of optical discs like DVDs, adhesive is typically supplied in the shape of a doughnut to the inside of the face of one substrate, and after superposing the other substrate, the laminated substrates are transported to the spinner apparatus by a substrate transport means not shown. A voltage may be applied between the substrates as necessary in this lamination process to sharpen the edges of the adhesive with the force of the electric field.

Figure 5:
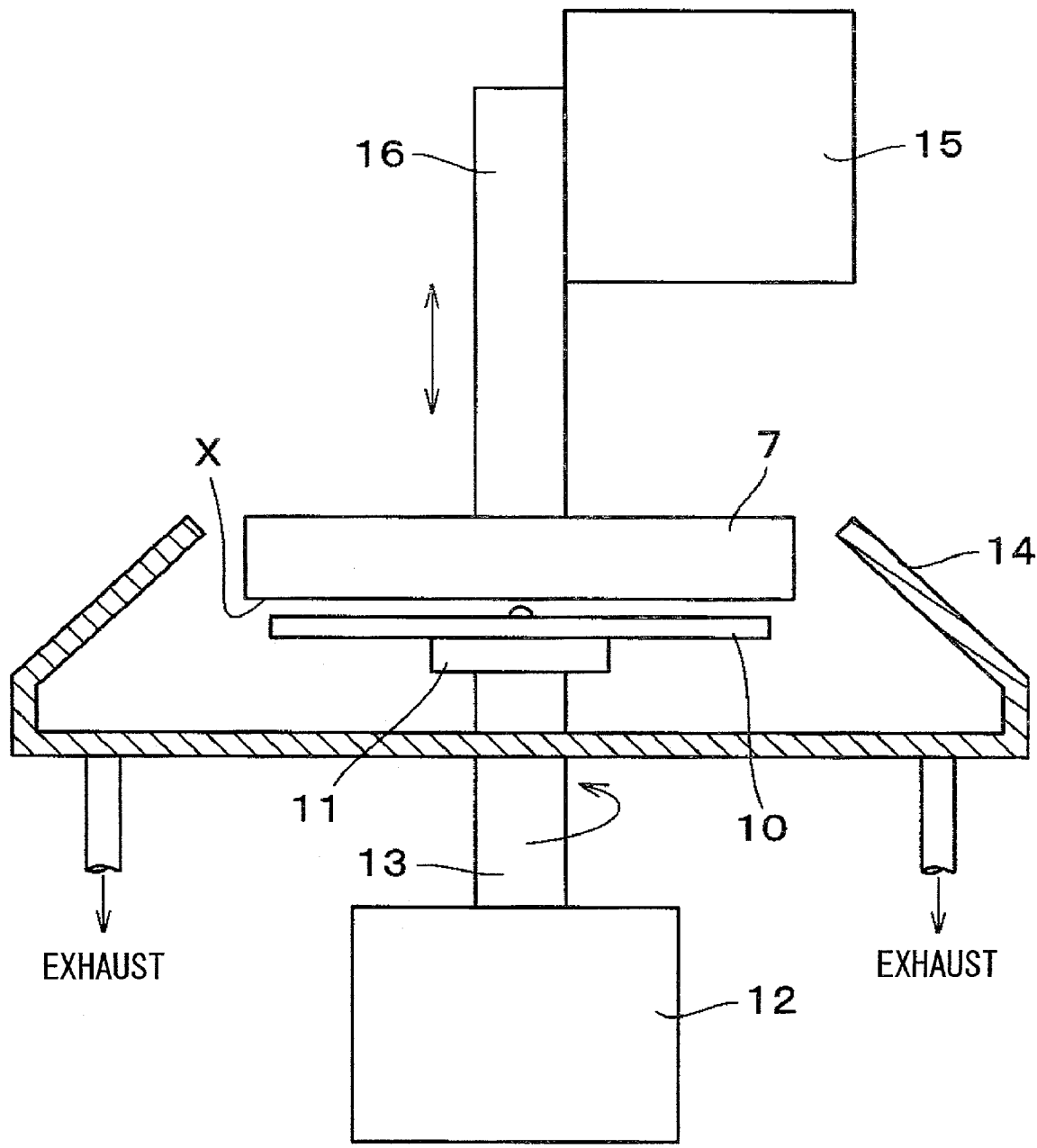
FIG. 5 is a drawing showing another embodiment of an adhesive curing apparatus and optical disc lamination apparatus in which it is used as claimed in the present invention.

An overview of the spinner apparatus is shown in FIG. 5. This apparatus is provided with a turntable 11 for holding and rotating substrates 10 that have been laminated with adhesive between them, a rotary shaft 13 that couples the turntable 11 to a rotary drive apparatus 12 such as a motor, and a partition 14 that surrounds the circumference of the substrates 10 on the turntable 11 except for above them. In this spinner apparatus, the substrates 10 are typically rotated at a high speed of 2000-6000 rpm for prescribed amount of time to shake off excess adhesive between them using centrifugal force and form an adhesive layer having a uniform, desired film thickness. After rotation is stopped, the substrates 10 are removed from the spinner apparatus by a substrate transport means not shown, sent to an ultraviolet irradiation mechanism not shown where they are irradiated with ultraviolet rays to cure the adhesive layer between the substrates.

In this embodiment, the semiconductor light-emitting unit 7 is provided in the upper portion of the spinner apparatus. The semiconductor light-emitting unit 7 has a similar constitution to that in the previously mentioned embodiment, and during operation of the spinner apparatus, is positioned above it. At the point substrates 10 stop rotating or their rotating speed prior to stopping rotating has decreased after excessive adhesive between the substrates has been shaken off, the semiconductor light-emitting unit 7 moves downward by the vertical movement drive apparatus 15 and vertical movement shaft means 16 so that its light-emitting surface X is positioned 1-10 mm, and preferably 1-7 mm, away from the upper surface of the substrates 10. When the light-emitting surface X of the semiconductor light-emitting unit 7 has reached a position 1-7 mm from the upper surface of the substrates 10, the semiconductor light-emitting unit 7 irradiates ultraviolet rays within a wavelength region of 280-450 nm onto the substrates 10 to cure the adhesive between the substrates. In this manner, the substrates 10, in which the substrates 1 and 2 have been completely laminated, are discharged from the spinner apparatus by a substrate transport means not shown.

Although irradiation of the substrates 10 with ultraviolet rays from the semiconductor light-emitting unit 7 may be carried out in a state in which the substrates 10 are stationary, in order to ensure irradiation amount of ultraviolet more uniformly, it is preferable to irradiate the substrates 10 with ultraviolet rays while rotating them at low speed. The substrates 10 may naturally be irradiated with ultraviolet rays while they are rotating or the rotation of the substrates 10 may be stop when they are irradiated.

Furthermore, in this embodiment, there is the problem in which some of the ultraviolet rays may leak from the semiconductor light-emitting unit 7 and cure a portion of the adhesive adhered to the inside of the partition 14 of the spinner apparatus. In the case of avoiding this, the semiconductor light-emitting unit 7 should be mounted above the spinner apparatus, the substrates 10 should be lifted up from the spinner apparatus and ultraviolet rays should be irradiated onto the substrates 10 outside the spinner apparatus.

In providing a somewhat detailed explanation of this, although not shown in the drawings, this apparatus is provided with a vertical movement drive apparatus that vertically moves the rotary drive apparatus 12 together with the rotary shaft 13 and the turntable 11. In this case, since the rotary shaft 13 is inherently able to rotate freely with respect to the partition 14, a structure should be employed in which it is also able to move in the vertical direction with respect to the partition 14. On the other hand, the vertical movement drive apparatus 15 and the vertical movement shaft means 16 that drive the semiconductor light-emitting unit 7 in the vertical direction become unnecessary, and the semiconductor light-emitting unit 7 is fixed at a prescribed location higher than the partition 14 of the spinner apparatus. When high-speed rotation stops in the spinner apparatus, a vertical direction drive apparatus not shown begins to operate that raises the rotary drive apparatus 12, the rotary shaft 13 and the turntable 11 together with the substrates 10 placed thereon, and stops them in the vicinity of the semiconductor light-emitting unit 7. When the upper surface of the substrates 10 reaches a location 1-7 mm from the light-emitting surface X, the semiconductor light-emitting unit 7 irradiates the substrates 10 with ultraviolet rays of a wavelength region of 280-450 nm that includes wavelengths of a range in which the transmittance of ultraviolet rays before curing of the adhesive is lower than the transmittance of ultraviolet rays after curing to cure the adhesive between the substrates. Whereupon, adhesive adhered to the inside wall of the partition 14 is not cured by ultraviolet rays. Although there is occurrence of slight rubbing, warping and other detrimental effects on the substrates when a substrate transport means not shown absorbs and clamps the substrate surface and discharges them from the spinner apparatus, in this embodiment, since the substrates are discharged from the spinner apparatus after the adhesive layer between the substrates has been cured, there is no occurrence of such detrimental effects.

Figure 6A:
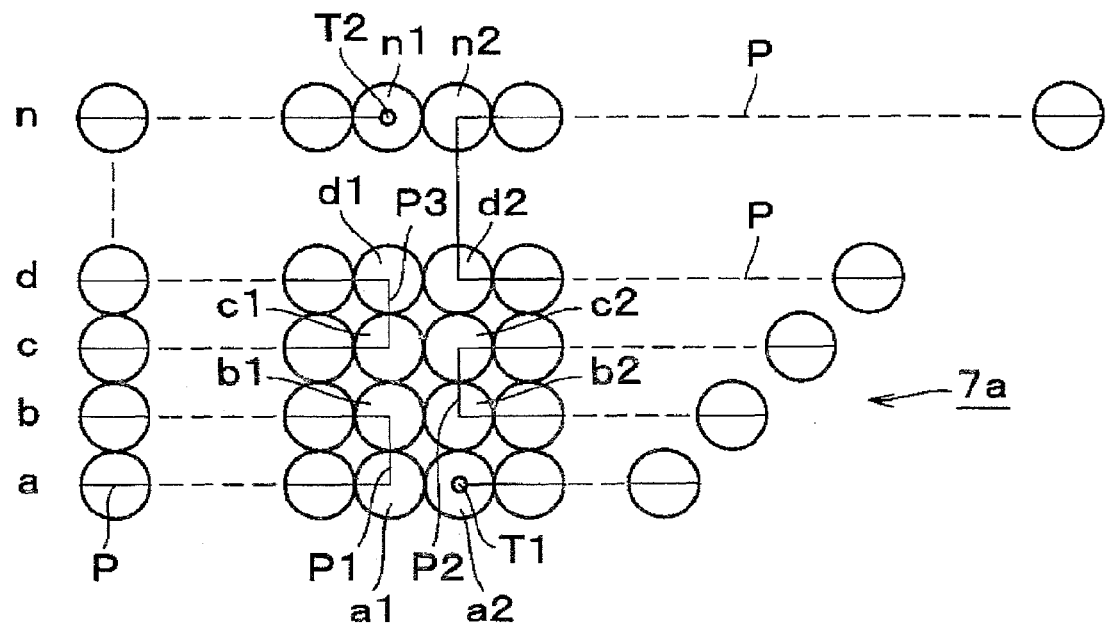
FIG. 6A is a drawing showing an example of the structure of a semiconductor light-emitting unit that composes the adhesive curing apparatus as claimed in the present invention, and shows a simulated arrangement of light-emitting semiconductor elements.
Figure 6B:
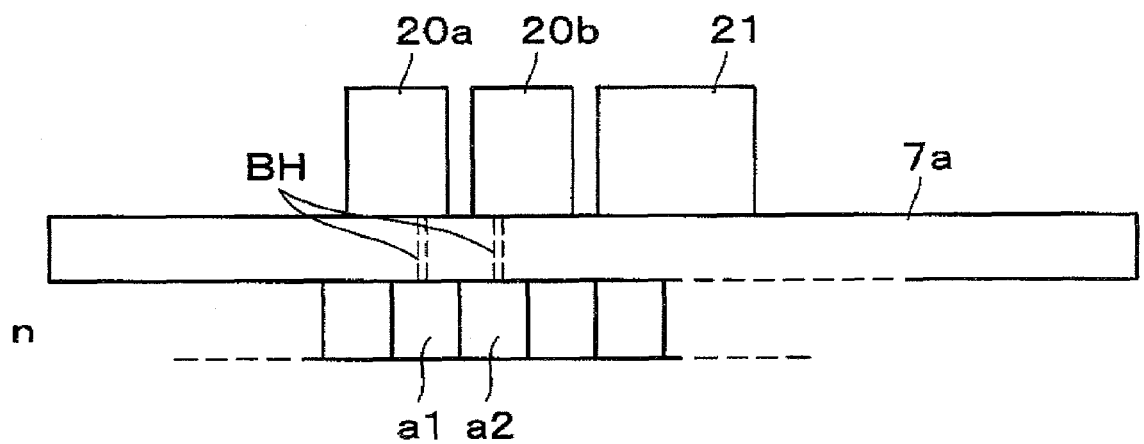
FIG. 6B is a lateral view of a semiconductor light-emitting unit showing an example of the structure of a semiconductor light-emitting unit that composes the adhesive curing apparatus as claimed in the present invention.

Next, an explanation is provided of an embodiment of the semiconductor light-emitting unit 7 using FIGS. 6A and 6B FIG. 6A shows a simulated arrangement of the light-emitting semiconductor elements 7a, and the linear rows a, b, c, . . . n in FIG. 6A are actually arranged in close proximity on the support 7b shown in FIG. 6B in the shape of concentric circles. The light-emitting diode row a indicates a row that composes the innermost circle, the light-emitting diode row b indicates a row that composes the second circle from the inside, and similarly the light-emitting diode row n indicates a row that composes the outermost circle. In this embodiment, the support 7b is a disc-shaped printed wiring board, and light-emitting diodes in each row of the light-emitting diode rows a, b, c, . . . n which are arranged to form a concentric circle, are all connected in parallel by conductive pattern P of the disc-shaped printed wiring board 7b. Moreover, by connecting a light-emitting diodes a1 of the innermost light-emitting diode row a with a light-emitting diodes b1 of the next outer light-emitting diode row b with a conductive pattern P1, the light-emitting diodes a1 are connected in series to the light-emitting diodes b1. The light-emitting diode row b and the third light-emitting diode row c from the inside are mutually connected in series by the connecting light-emitting diodes b1 and a light-emitting diodes c1 of the light-emitting diode row c with a conductive pattern P2. In addition, light-emitting diode row c and the fourth light-emitting diode row d are mutually connected in series by connecting light-emitting diodes c1 and light-emitting diodes d1 of light-emitting diode row d with a conductive pattern P3. Other adjacent rows of light-emitting diodes are similarly connected in series with conductive patterns. T1 and T2 indicate input terminals, and when a prescribed voltage is applied to the input terminals T1 and T2, the light-emitting diodes of each light-emitting diode row a, b, c, . . . n all emit light simultaneously.

By simultaneously emitting light from all light-emitting diodes of each light-emitting diode row a, b, c . . . n, the entire surface of the substrate 1 is simultaneously irradiated with ultraviolet light in the case of FIG. 1, and the entire surface of the adhesive layer 3 is simultaneously cured. However, since the adhesive layer 3 is cured by a photopolymerization reaction, a considerable amount of heat is generated during that polymerization, and as a result, the temperatures of the substrates 1 and 2 rise causing warping of the substrates 1 and 2. In order to alleviate the generation of heat during curing and diminish warping of the substrates 1 and 2, it was determined that it is effective to emit light from the light-emitting diode rows a, b, c, . . . n in order moving from the inside to the outside rows.

In order to emit light from the light-emitting diode rows a, b, c, . . . n in order, it is necessary to provide a switching element like a MOSFET between adjacent the light-emitting diode rows a and b, b and c, . . . n−1 and n. In this case, instead of connecting in series adjacent light-emitting diode rows such as the light-emitting diodes a1 and light-emitting diodes b1 with conductive patterns, the light-emitting diodes b2 and light-emitting diodes c2 and so forth as was previously mentioned with reference to FIG. 6A, the above switching elements are provided between the light-emitting diodes a1 and light-emitting diodes b1, light-emitting diodes b2 and light-emitting diodes c2, and the light-emitting diodes n−1 and light-emitting diodes n, after which the light-emitting diodes should be connected in series through these switching elements. In addition, as shown in FIG. 6B, a drive unit 21, which sequentially switches on and off these switching elements 20a and 20b is attached to the back of the disc-shaped printed wiring board 7b. The switching element 20a is provided between the light-emitting diodes a1 and light-emitting diodes b1, one end of the switching element 20a is connected to the light-emitting diodes a1 through the through holes BH formed in the printed wiring board 7b, and the other end of switching element 20a is connected to light-emitting diodes b1 through another through hole BH formed in the printed wiring board 7b. In addition, the switching element 20b is provided between the light-emitting diodes b2 and light-emitting diodes c2, one end of the switching element 20b is connected to the light-emitting diodes a2 through the through holes BH formed in the printed wiring board 7b, and the other end of the switching element 20b is connected to the light-emitting diodes c2 through another through holes BH formed in the printed wiring board 7b. The switching elements that connect the other prescribed light-emitting diodes are positioned on the other side of the paper from the switching elements 20a and 20b in FIG. 6B.

When light is emitted, the drive unit 21 sequentially switches on the switching elements 20a, 20b . . . for a fixed amount of time at fixed intervals. Whereupon, all of the light-emitting diodes of the light-emitting diode row a first light, and after a prescribed amount of time such as, for example, 20 ms, all of the light-emitting diodes of the light-emitting diode row b light as a result of switching on the switching element 20a. By then similarly sequentially switching on the switching elements, the light-emitting diode rows a, b, c, . . . n can be sequentially be lit. Moreover, when the predetermined on time of the switching elements 20 passes, they sequentially switch off at 20 ms intervals starting with the switching element 20a, so that finally the emission of light by the light-emitting diodes of the light-emitting diode row n is stopped. In the case of sequentially delaying the emission of light for a predetermined fixed amount of time, and performing emission for a fixed amount of time, a delay circuit composed of, for example, a capacitor and resistor, may also be used instead of switching elements.

In this embodiment, a CPU not shown may be provided in the drive unit 21, and the duration of the on time of each switching element 20, the timing of on time and the order in which the switching elements are switched on and so forth may be stored in advance in its memory. In this case, by for example, measuring in advance which region of the adhesive layer is difficult to be cured and which region is cured easily, and setting the emission time of the light-emitting diodes corresponding to the region that is difficult to be cured to be longer than the light-emitting diodes corresponding to the region that is cured easily, uniform curing can be expected in the shortest amount of light irradiation time. Furthermore, although the light-emitting diode rows a, b, c, . . . n are arranged in series via the switching elements 20 in the above embodiment, since each light-emitting diode in the light-emitting diode rows a, b, c, . . . n is connected in parallel, the voltage of a commercial power supply is sufficient for the voltage. Furthermore, all light-emitting diode rows a, b, c . . . n may also be mutually connected in parallel via their respective switching elements 20.

Moreover, although not shown in the drawings, together with combining a light irradiation mechanism, in which all light-emitting diode rows a, b, c . . . n are connected in parallel via their respective switching elements, with the spinner apparatus shown in FIG. 5, a sensor may be prepared capable of measuring the thickness of the adhesive layer from the innermost circle to the outermost circle. In this case, when performing high-speed rotation to spread adhesive provided between the substrates 10, by measuring the thickness from the adhesive layer of the innermost circle to the adhesive layer of the outermost circle, comparing those measured values with the set values stored in the CPU, and switching on the switching element of the light-emitting diode row corresponding to the location where the thickness has decreased to the set value, ultraviolet rays can sequentially be irradiated from the location where the thickness has reached the set value by first switching on the light-emitting diode of the light-emitting diode row, and then sequentially switching on the switching element corresponding to the location where the adhesive layer has reached the set thickness. As a result, an adhesive layer that more closely approximates the set value at all locations is obtained, thereby allowing the obtaining of an optical disc of higher quality.

In addition, although not shown in the drawings, in a different embodiment, rows of light-emitting diodes in which all light-emitting diodes are connected in series or in parallel, or in which a plurality of groups of the light-emitting diodes which are respectively composed by connecting predetermined amount of the light-emitting diodes in series are connected in parallel, are arranged in the shape of a spiral, and are arranged such that the diameter of the innermost spiral-shaped light-emitting diode row is smaller than the inner diameter of the adhesive layer between the substrates, and such that the diameter of the outermost light-emitting diode row is larger than the outer diameter of the adhesive layer between the substrates. In this case, more preferably, either delay elements or switching elements are connected between the rows of light-emitting diodes connected in series or in parallel, or switching elements or delay elements are connected for every plurality of light-emitting diodes, such as for every 10 light-emitting diodes. Due to the above delay elements or by sequentially switching on the above switching elements, the spiral-shaped rows of light-emitting diodes can be lit from the inside to the outside sequentially for each light-emitting diode or sequentially for each plurality of light-emitting diodes. As a result, an optical disc can be obtained of higher quality.

In the above embodiments, although a large number of light-emitting diodes were arranged either concentrically or spirally so that the light-emitting surface is equal to or somewhat larger than the surface on which the adhesive layer is cured, the large number of light-emitting diodes may also be arranged randomly in close proximity to each other, or hexagonally, concentrically or spirally so that the interval between adjacent light-emitting diodes is a fixed distance. In addition, instead of arranging a large number of light-emitting diodes so that the light-emitting surface is equal to or somewhat larger than the surface on which the adhesive layer is cured, light-emitting diodes may also be arranged so that only a portion of the surface on which the adhesive layer is cured is used as the light-emitting surface.

Figure 7:
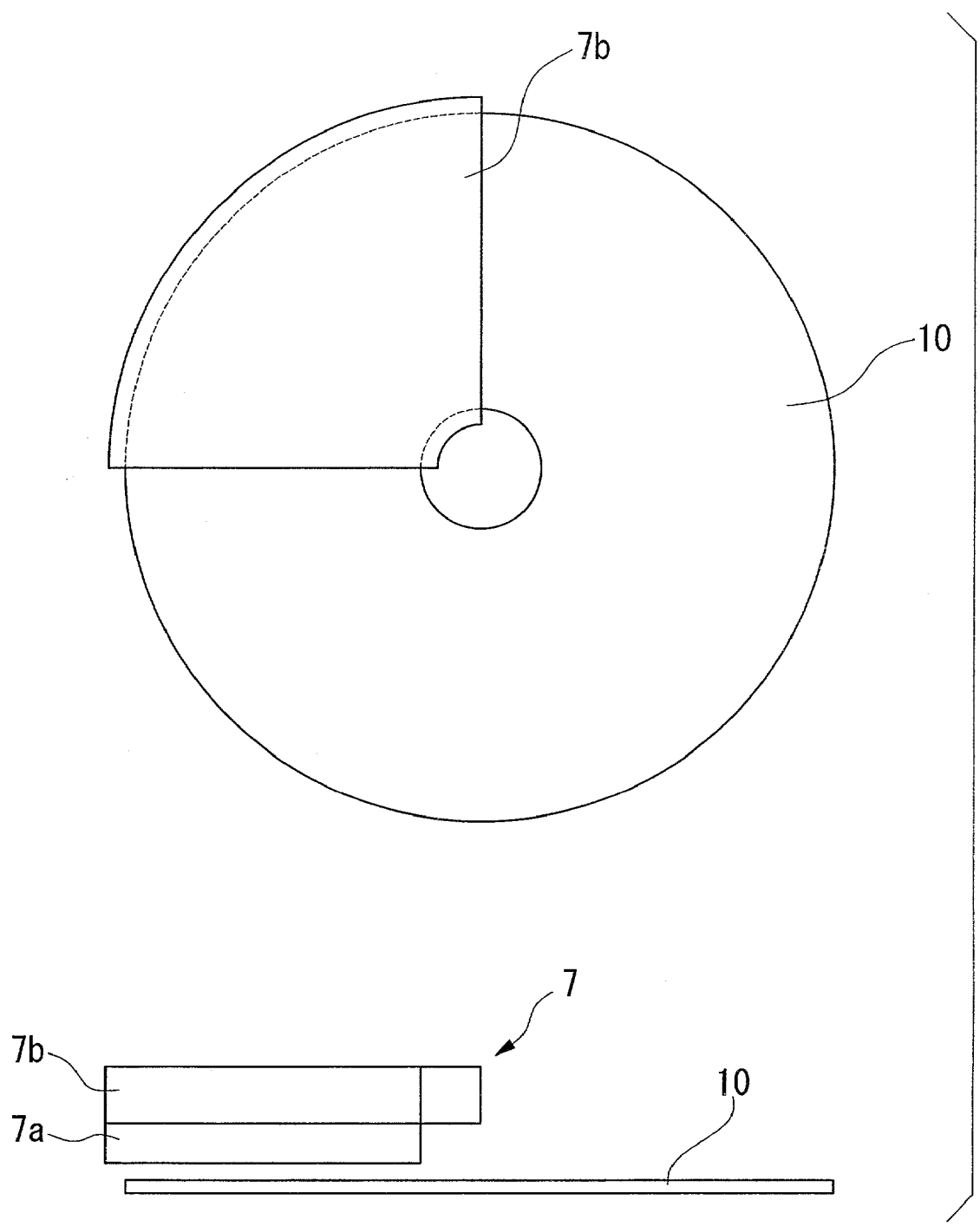
FIG. 7 is a drawing for explaining a semiconductor light-emitting unit that is another example of the adhesive curing apparatus as claimed in the present invention.

The following provides an explanation of this embodiment using FIG. 7. The support of the semiconductor light-emitting unit 7 has a fan-shaped printed wiring board 7b, and a plurality of light-emitting diodes 7a are densely arranged in close proximity on the printed wiring board 7b. All of these light-emitting diodes 7a are connected in parallel by a conductive pattern (not shown) formed on the printed wiring board 7a, and thus, all light-emitting diodes 7a emit light simultaneously. Its light-emitting surface X is at a prescribed distance of 10 mm or less from the surface of the substrate 10. In this embodiment, the semiconductor light-emitting unit 7 and substrate 10 must be rotated relative to each other at a fixed rotating speed. Although a rotary drive mechanism is normally required to rotate the substrate 10, if combined with a spinner apparatus as mentioned above, a special rotary drive mechanism is not required. In addition, by using a fan shape for the shape of the support, the number of the light-emitting diodes 7a arranged on the outside increases nearly proportional to diameter as compared with the number on the inside. Thus, even though the peripheral velocity may differ between the inside and outside, the irradiation time by light-emitting electrodes 7a can be made to be equal. In this semiconductor light-emitting unit 7, the number of the required light-emitting diodes 7a can be reduced considerably in comparison with the previously mentioned embodiments, thereby making it possible to reduce costs. Furthermore, although the curing time of the adhesive layer naturally becomes longer than in the previously mentioned embodiments if the light-emitting diodes 7a having identical characteristics are used, since cooling air can be blown onto the substrate at the portion where the semiconductor light-emitting unit 7 is not present to diminish the effects of the heat of the photopolymerization reaction that is generated during curing of the adhesive layer, the light-emitting surface X can be brought even closer to the substrate 10.

In addition, although the light-emitting diodes 7a of the semiconductor light-emitting unit 7 were light continuously for a fixed amount of time in the previously mentioned embodiments, they may also be made to emit light in pulses, namely intermittently. In this case, by applying a high-peak current to the light-emitting diodes 7a, high-luminosity ultraviolet rays can be emitted as compared with the case of emitting light continuously. In this manner, by sequentially applying a current having a peak larger than that in the case of continuous emission from the light-emitting diodes of an inner circle to the light-emitting diodes of an outer circle, higher quality adhesive curing can be expected. Moreover, adhesive of more uniform and high quality can be cured by controlling the pulse width, peak value or length of the dormant period between current pulses of the current supplied to each light-emitting diode 7a as necessary.

Moreover, the following provides a description of adhesive suitable for use in the present invention. Although photopolymerization initiators are added to current commercially available ultraviolet-cured adhesives to lower the sensitivity to ultraviolet rays so that curing is not initiated during the course of handling, since the luminosity of the ultraviolet rays of light-emitting diodes is lower than that of flash lamps, it is preferable to increase the amount of photopolymerization initiator which is added to the adhesive so as to increase the sensitivity to ultraviolet rays having a wavelength of 280-450 nm. In addition, when the amount of photopolymerization initiator added to the adhesive is increased, and the sensitivity to ultraviolet rays becomes considerably high, it is not possible to handle the adhesive in conventional environments. Thus, it is preferable to use red light-emitting diodes for lighting in this case. Since red light-emitting diodes emit ultraviolet rays having a wavelength of several tens of nm centering about a frequency of 635 nm, and do not contain wavelengths of the above 300-420 nm, adhesives in which sensitivity to ultraviolet rays has been increased can be handled in the same manner as in the past in the presence of lighting using red light-emitting diodes. Furthermore, since yellow light-emitting diodes that emit yellow light of a wavelength of about 590 nm or green light-emitting diodes that emit green light of a wavelength of about 520 nm also do not substantially contain light of a wavelength in the above range of 300-420 nm, they can also be used for lighting. In this manner, by using diodes for emitting ultraviolet rays as a curing apparatus for adhesives having increased sensitivity to ultraviolet rays, and using light-emitting semiconductor elements that do not contain wavelengths of 280-450 nm, such as red light-emitting diodes or yellow light-emitting diodes, for the lighting at locations where the adhesive is handled, the amount of electrical power used can be decreased considerably. This is extremely preferable in terms of protecting the environment, and is also useful in reducing costs.

Moreover, in the case of using diodes for emitting ultraviolet rays as a curing apparatus for adhesives having increased sensitivity to ultraviolet rays, and using light-emitting semiconductor elements that do not contain wavelengths within a range of 300-420 nm for lighting at locations where the adhesive is handled, the step in which increased sensitivity adhesive is supplied to the substrate, and the step in which the substrates are superposed with the adhesive and then laminated by spinning, are carried out under lighting by light emitted by the above light-emitting semiconductor elements.

Furthermore, in the above embodiments, although the explanation focuses on an optical disc substrate for the substrate, the substrate may be another transparent, namely that having high optical transmittance, glass or another plate. In this case as well, the substrates can be laminated in the same manner as in the above embodiments.

As has been described above, in the present invention, since an adhesive between two substrates is adhered followed by lamination of those substrates using a semiconductor light-emitting unit comprised of a plurality of light-emitting diodes, the amount of heat generated is much lower than a conventional lamp, thereby making it possible to lower the thermal effects on the optical disc. In addition, since these light-emitting diodes haves longer service life than a conventional lamp, running costs can be decreased. Moreover, since the amount of electrical power used for emitting light can be reduced considerably, effects on the environment can be minimized.

Moreover, although a description has been provided of adhering two media, namely two substrates, in the above explanation, the present invention is not limited to this, but rather can be similarly applied to the case of curing an adhesive on a medium by directly irradiating that adhesive with ultraviolet rays of a wavelength having a peak emission intensity within the range of 280-450 nm, and which does not substantially contain wavelengths outside this range. In addition, although a description has been provided regarding substantially complete curing of an adhesive in the above explanation, the case of semi-curing, in which only a portion of the adhesive or, for example, only the surface and its periphery of the adhesive, are cured, is also included in the present invention. Semi-curing is effective for temporarily fastening two substrates during substrate lamination.

Namely, after uniformly spreading an adhesive between two substrates by spinning and so forth, if the substrates are temporarily fastened at that position and then transported to the location where final curing is carried out thereafter, positional shifting between the substrates during transport can be completely prevented, thereby allowing the obtaining of, for example, high-quality optical discs.

What is claimed is:

1. An optical disc lamination apparatus comprising a spinner apparatus for spreading an adhesive on a surface area between a first substrate and a second substrate on which a recording layer is formed on at least one of said substrates, and further comprising a curing apparatus that cures said adhesive by irradiating said adhesive with ultraviolet rays through said substrates; wherein, said curing apparatus comprises a semiconductor light-emitting apparatus, comprising a plurality of light-emitting semiconductor elements arranged substantially in concentric circles at nearly constant intervals or in close mutual proximity over the surface area containing said adhesive, arranged at a prescribed distance from said adhesive, wherein said adhesive is cured by sequentially emitting ultraviolet rays on a time delay from an innermost concentric circle to an outermost concentric circle.

2. An optical disc lamination apparatus comprising a spinner apparatus for spreading an adhesive on a surface area between a first substrate and a second substrate on which a recording layer is formed on at least one of said substrates, and further comprising a curing apparatus that cures said adhesive by irradiating said adhesive with ultraviolet rays through said substrates; wherein, said curing apparatus comprises a semiconductor light-emitting apparatus, comprising a plurality of light-emitting semiconductor elements arranged in the shape of a spiral at nearly constant intervals or in close mutual proximity over the surface area containing said adhesive, arranged at a prescribed distance from said adhesive, wherein said adhesive is cured by sequentially radiating ultraviolet rays at a delay from the inside to the outside by adjacent said light-emitting semiconductor elements that form said spiral along the radial direction.

3. An apparatus according to claim 1 wherein, said light-emitting semiconductor elements are either mutually connected in parallel or a prescribed number are connected in series, and those that are connected in series are connected in parallel.

4. An apparatus according to claim 1 wherein, an overall length of the day time of said ultraviolet rays sequentially emitted on a time delay is nearly equal to or longer than a prescribed curing time of said adhesive.

* * * * *